Feb. 25, 1936. E. A. LEDERER ET AL Re. 19,870

ELECTRON DISCHARGE DEVICE WITH INDIRECTLY HEATED CATHODE

Original Filed Nov. 16, 1927

INVENTORS
ERNEST A. LEDERER.
JOHN W. MARDEN.

BY M. F. Regan
ATTORNEY

Reissued Feb. 25, 1936 Re. 19,870

UNITED STATES PATENT OFFICE 19,870

ELECTRON DISCHARGE DEVICE WITH INDIRECTLY HEATED CATHODE

Ernest A. Lederer, Glen Ridge, and John W. Marden, East Orange, N. J., assignors to Westinghouse Lamp Company, a corporation of Pennsylvania Original No. 1,945,746, dated February 6, 1934, Serial No. 233,537, November 16, 1927. Application for reissue April 27, 1934, Serial No. 722,788

3 Claims. (Cl. 250—27.5)

This invention relates to an electron discharge device and more particularly to such device of the type in which the cathode is heated indirectly by a heating element disposed adjacent thereto.

In the manufacture of electron discharge devices in which the cathode is designed to be heated through the agency of alternating current, it has been the usual practice to construct the cathode in the form of a hollow metal cylinder and to heat the same by conduction from an electrically insulated heating element. The heating element of such cathode usually consists of a tungsten filament which is supported within an aperture in a cylindrical insulator about which the hollow metal cylinder, coated with a thermionically active material such as the oxides of the alkaline earth metals, is positioned. This coated cylinder constitutes an equi-potential cathode and may be provided with a terminal separate from those of the heating element.

In constructing cathodes of this type, difficulty has been encountered herefore, due to interaction of the tungsten filament with the insulator and to the fusing of the insulator onto the filament, resulting in early burn-out of the heating element. This difficulty has been overcome to a large extent by the use of thorium oxide, zirconium oxide or rare earth oxide in place of the usual porcelain insulator.

The method which is used very largely and which is preferred by us for producing the thermionically active coating on the metallic cylinder is to first coat the cylinder with the carbonates of the alkaline earth metals, which are baked thereon in a firmly adherent manner in an atmosphere of carbon dioxide. After the cathode has been assembled within the evacuated device, the cylinder is heated to a high temperature to convert the alkaline earth carbonates into oxides of the alkaline earth metals. It has not been found advisable to effect this conversion of the carbonates to the oxide before assembly of the cathode in the device, since the oxides apparently become contaminated in air and the electron emission of the cathode is impaired and heretofore, this heating of the metal cylinder has been accomplished by passing a heavy current through the heating elements to raise the same to an abnormal temperature.

However, due to the high temperature to which the heating element must be raised to heat the surrounding cylinder to the decomposition temperature of the carbonates, a chemical reaction appears to take place between the tungsten and the insulator when the same is made of porcelain or isolantite, possibly due to interaction between the tungsten and water vapor, carbon dioxide or other gas liberated from the insulator. The insulator also fuses on to the tungsten heater wire during this heat treatment and upon cooling of the cathode assembly, a portion of the tungsten adheres to the porcelain or isolantite and is chipped off from the tungsten body, due to the difference in contraction of the insulator and the tungsten filament. As a result of these difficulties, the filament burns out prematurely and the life of the device is relatively short.

One of the objects of the present invention is to provide a construction in which the above mentioned difficulties will be avoided and in which conversion of the carbonate coating on the cathode may be effected without necessity of employing the enclosed heating element Another object is to provide a construction in which the use of solid insulating material, such as porcelain, between the cathode and the heating element may be entirely dispensed with.

A further object is to provide a construction in which the electrodes will be shielded from electrons emitted from all portions of the heating element.

A further object is to provide a simple and rigid support for the electrodes which will enable the cathode to be heated by high frequency induction current without substantial heating of the other electrodes.

Other objects and advantages will hereinafter appear.

In accordance with the present invention, we construct the cathode in the form of a hollow metallic member having a coating of a thermionically active material on the exterior thereof and a heating element contained therein. The heating element may be supported within a refractory insulating member contained within the cathode so as to heat the same by conduction or the refractory insulation may be entirely omitted and the cathode heated by radiation from the heating element. If desired, the heating element may be operated at an electron emitting temperature and a difference in potential may be maintained between the heating element and the cathode to cause the cathode to be heated by electron bombardment from the heating element.

The cathode is arranged so as to form one portion of a closed loop in which the currents may be induced by a high frequency coil disposed outside of the envelope. This closed loop is arranged in such position that, upon heating thereof by high frequency induction current, heating currents are not set up in other and undesired portions of the electrode assembly.

With this construction, it is possible to heat the cathode during exhaust, to a high temperature to decompose the carbonates of the alkaline earth metals thereon and to convert the same into oxides of the alkaline earth metals without heating the filament and having undesired reaction with carbon dioxide or other gases formed during the operation.

Shields are disposed about the upper and lower ends of the cathode to prevent stray or undesired discharges taking place between the heating element and the control electrode or anode which might result in alternating current hum when the device is employed in radio receiving apparatus.

In order that the invention may be more fully understood, reference will be had to the accompanying drawing in which.

Figure 1:
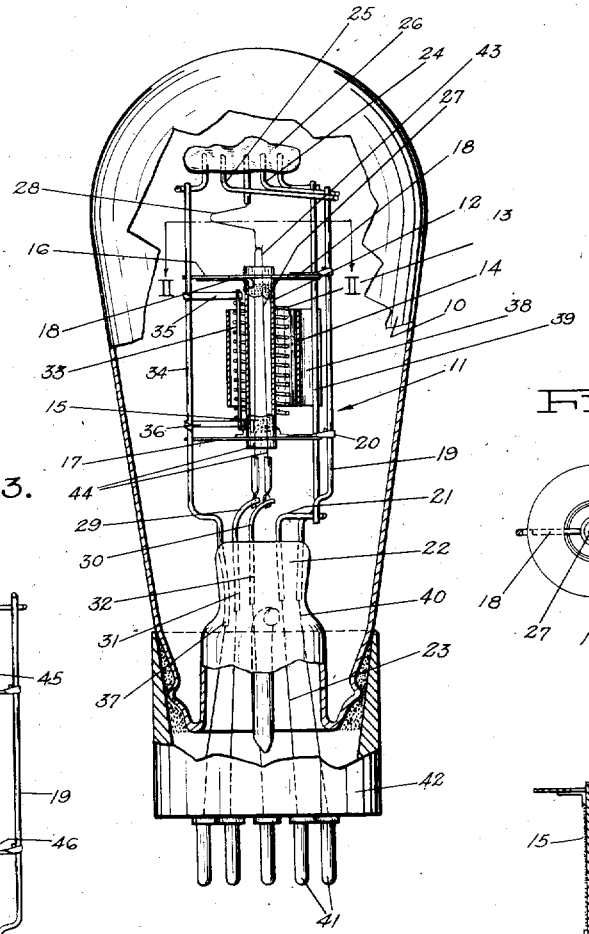
Fig. 1 represents an electron discharge device partly in section embodying the present invention.

The electron discharge device shown in Fig. 1 comprises a hermetically sealed envelope 10 having an electrode assembly 11 therein composed of a cathode 12, grid or control electrode 13 and anode 14. The cathode 12 is in the form of a hollow metal cylinder, preferably of nickel having on the exterior surface thereof a coating 15 of the oxides of the alkaline earth metals or other thermionically active material. Annular discs 16 and 17 surround the upper and lower ends respectively of the cathode 12 and are rigidly secured thereto by a number of radially extending supporting strips 18. The discs 16 and 17 serve to support the cathode from the support wire 19 through intermediate supporting strips 20 welded to the discs and to the support wire. The support wire 19 at its lower end is secured to a rigid wire 21 sealed in the press 22 of the device and joined to leading-in conductor 23. At the upper end the support wire 19 is welded to two bracing supports 24 and 25 secured in a glass bead 26 positioned above the electrode assembly.

A heating element 27 which may take the form of an inverted V-shape filament of tungsten or other highly refractory metal, having the adjacent legs arranged to neutralize the electric fields set up therein, is disposed within the cylindrical cathode 12 and is supported at its loop portion by a resilient member 28, having one end secured in the glass bead 26. The free ends of the filament are joined to support wires 29 and 30 which are connected to the leading-in wires 31 and 32 respectively for supplying heating current thereto. Other forms of heating element may be employed, however, such as a helical filament.

A grid electrode 13 consists of a helically wound wire, the adjacent turns of which are secured to a grid support wire 33, mounted on the rigid support wire 34 by the intermediate strips 35 and 36. The support wire 34 is secured at its upper end to the bead 26 and at its lower end is sealed in the press and joined to the leading-in conductor 37.

The plate electrode or anode 14 consists of a metallic cylinder having a radially extending flange 38 to which a support wire 39 is welded or otherwise suitably secured. The upper end of the wire 39 is secured in the bead 26 and the lower end thereof is sealed in the press 22 and joined to the leading-in conductor 40.

The leading-in wires 23, 31, 32, 37 and 40 are electrically connected to the contact pins 41 carried by the base 42.

The annular discs 16 and 17 serve to protect the grid 13 and anode 14 against a flow of electrons from the exposed ends 43 and 44 of the heating element. We have found, due to the high temperature at which the heating element is operated, that electrons are emitted therefrom and drawn to the other electrodes if some shielding means is not provided. This electron flow sets up a fluctuating current in the output circuit of the device which, in many cases, is detrimental to its operation. The discs 16 and 17 may be composed of metal or a suitable insulating material such as mica. If they are composed of insulating material it is, of course, necessary to extend the supporting strips 20 over to the hollow cylinder 12 to conduct the current to the cathode from the support wire 19. Obviously, in place of making the members 16 and 17 of disc form, they may be conical or any other suitable shape which will provide a barrier between the exposed ends of the heating element and the anode and control electrode.

The supporting members 20, discs 16 and 17, support wire 19 and cylinder 12 form a closed loop. The cathode 12 should be formed of thin sheet metal and the remaining portions of the loop of sufficiently heavy material to render it possible to heat up the cathode cylinder to a high temperature by means of a high frequency induction coil disposed externally of the envelope and arranged with its axis substantially normal to the bulb. This permits the oxide coating on the cathode to be formed from a coating of the alkaline earth carbonates after the cathode is incorporated in the exhausted envelope without necessitating the heating of the tungsten filament 27.

Figure 2:
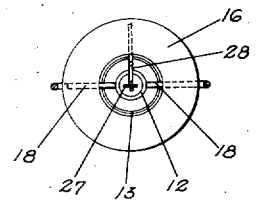
Fig. 2 is a sectional view taken on line II—II of Fig. 1.
Figure 3:
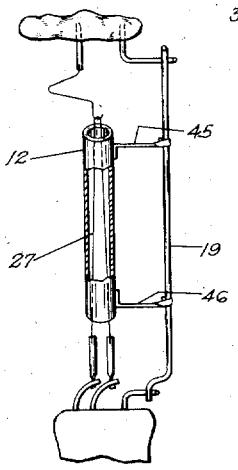
Fig. 3 is a fragmentary view showing a modified form of cathode construction.
Figure 4:
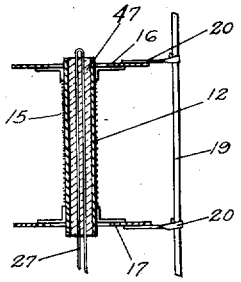
Fig. 4 is a sectional view of a further modified form of cathode construction.

Of course, if desired, the shields 16 and 17 may be omitted in which case the cathode cylinder 12 may be supported directly from the wire 19 by the supporting strips 45 and 46 as shown in Fig. 3 so as to form the closed loop with the cathode. In Fig. 4 a modified form of cathode is illustrated in which a solid insulating member 47 is positioned within the cathode 12 and has a pair of apertures therein through which the heating element 27 extends, whereby the cathode is heated by conduction rather than radiation. In the form shown in Figs. 1, 2 and 3 in which the insulating member 47 is not employed, the cathode 12 may be heated by electron bombardment from the heating element 27 by maintaining the heating wire negatively charged with respect to the interior surface of the cylinder.

It is obvious, of course, that many changes may be made in the construction shown and described and we do not desire to be limited thereby but desire the described embodiments to be construed in all respects as illustrative and not restrictive, reference being had to the appended claims to indicate the scope of the invention.

What is claimed is:

1. An electron discharge device comprising an evacuated envelope, a hollow thermionically active uni-potential cathode and an anode, an electron emitting filament within said cathode having its opposite ends non-inductively arranged, said electron emitting filament extending beyond one limit of said cathode and means externally of said cathode for shielding said anode from the electrons emanating from said electron emitting filament.

2. An electron discharge device comprising an evacuated envelope, a hollow cathode therein, a heating element disposed within said cathode, radially extending dielectric shields disposed externally about the opposite ends of said cathode and an anode positioned between said shields.

3. An electron discharge device comprising an evacuated envelope, a tubular cathode therein, a heating element within said cathode, a closed electrically conductive loop within said envelope including said cathode, whereby said cathode may be inductively heated from an external source, an annular dielectric shield surrounding each end of said cathode and a plurality of electrodes disposed about said cathode between said shields.

ERNEST A. LEDERER.
JOHN W. MARDEN.